Nov. 8, 1938.   R. S. KELLOGG   2,136,137
VEHICLE WHEEL
Filed March 11, 1935   2 Sheets-Sheet 1

Inventor
RALPH S. KELLOGG
By Tibbetts and Hart
Attorneys

Nov. 8, 1938.                R. S. KELLOGG                2,136,137
                             VEHICLE WHEEL
                          Filed March 11, 1935           2 Sheets-Sheet 2
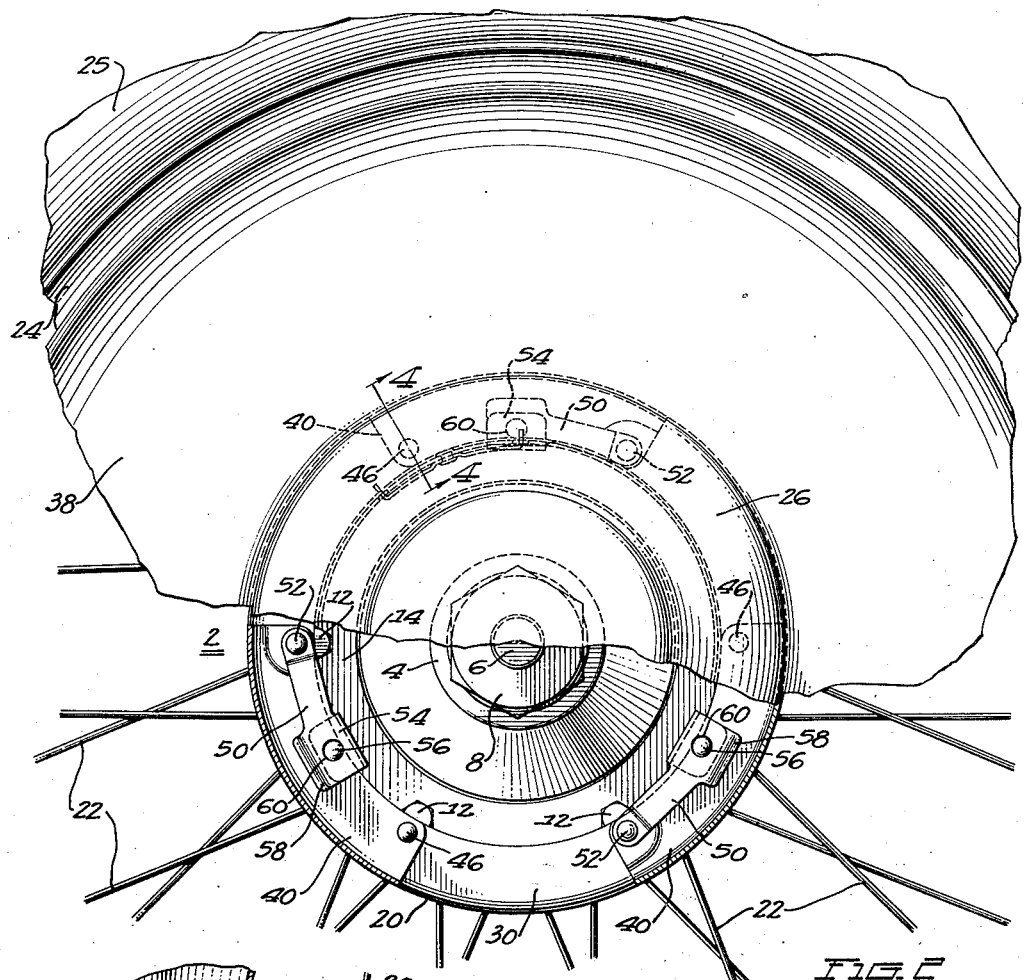
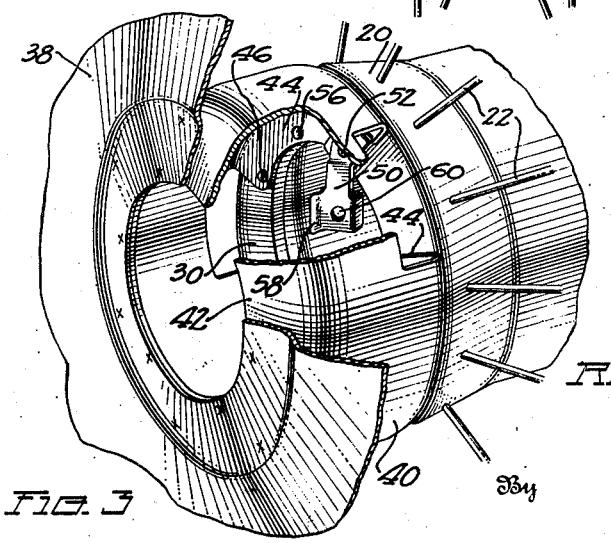
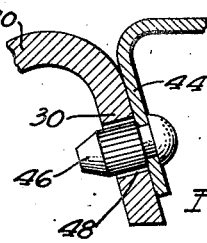
Inventor
RALPH S. KELLOGG
By Tibbetts and Hart
Attorneys Patented Nov. 8, 1938

2,136,137

UNITED STATES PATENT OFFICE 2,136,137

VEHICLE WHEEL

Ralph S. Kellogg, Royal Oak, Mich., assignor to Packard Motor Car Company, Detroit, Mich., a corporation of Michigan Application March 11, 1935, Serial No. 10,356

8 Claims. (Cl. 301—37)

This invention relates to motor vehicles and more particularly to wheels for such vehicles.

Cover plates have been provided for covering the spokes of spoked wheels of motor vehicles, these plates being attachable to conventional wheels. Such cover plates are usually applied to wheels of the wire wheel type. These plates, which extend between the hub and the rim and cover the entire spoke structure of a wheel, render the wheels easier to keep clean and cause them to present the appearance of disk wheels.

The fastening devices for these covering plates usually consist of bolts or screws and the assembly of a plate with a wheel and the securing of the same in position requires considerable labor and time. The application of such plates to a full set of wheels for a vehicle adds materially to the cost of manufacture of the vehicle.

One object of the present invention is to produce a novel and improved cover construction for covering the spokes of motor vehicle wheels and securing means therefor in which the cover may be quickly and easily attached to a wheel and will be held securely in position on the wheel during the operation of the vehicle.

Another object of the invention is to produce a novel construction for attaching a cover for the spokes of a wheel of a motor vehicle in position on the wheel in which, in applying the cover to the wheel, the attaching devices may be readily located in operative holding relation to the parts of the cover and wheel.

Another object of the invention is to produce an improved construction for detachably holding the cover for the spokes of a motor vehicle wheel in position on the wheel in which the rotation of the wheel tends to maintain the holding devices in holding positions.

With the above and other objects in view the invention consists in a construction embodying the novel and improved features hereinafter described and particularly pointed out in the claims, the advantages of which will be readily understood and appreciated by those skilled in the art.

The invention will be clearly understood from the accompanying drawings illustrating a construction embodying the invention in its preferred form and the following detailed description of the construction therein shown.

In the drawings Fig. 1 is a view partly in elevation and partly in section taken in a plane containing the axis of a wheel illustrating a wire wheel having a construction embodying the invention applied thereto.

Fig. 2 is a view partly in side elevation and partly in vertical section taken substantially on the line 2—2 of Fig. 1 with a portion of the hub cap removed.

Fig. 3 is a detail perspective view partly broken away illustrating certain portions of the cover construction and the hub of the wheel and Fig. 4 is a detail sectional view taken substantially on the line 4—4 of Fig. 2.

Figure 1:
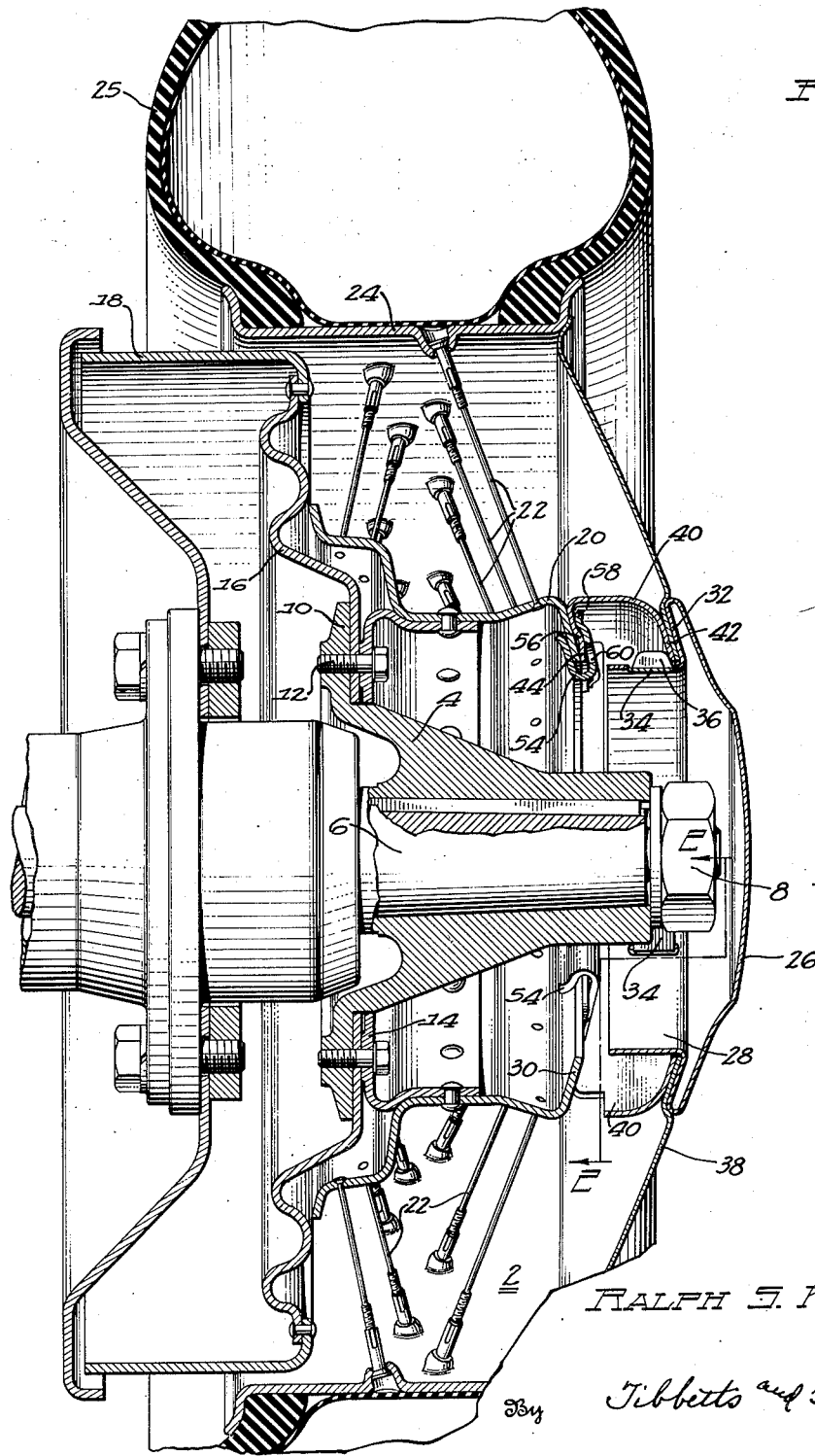

The invention is shown in this application as applied to a wire wheel indicated as a whole at 2. The wheel comprises an inner hub member 4 fixed to the end of the axle 6 and held in position upon the axle by means of a nut 8. The hub member is provided with an outwardly extending flange 10 to which is secured to bolts 12 a sheet metal ring 14. A disk 16 is also secured by said bolts to said flange and carries at its periphery a brake drum 18. To the ring 14 is secured, preferably by a series of rivets, an annular outer sheet metal hub member 20 to which are attached, as shown clearly in Fig. 1, the inner ends of a series of wire spokes 22. The outer ends of the spokes are connected with a rim 24 upon which is mounted a tire 25.

The construction thus far described constitutes one of the conventional forms of wire wheels. The conventional construction also comprises a hub cap 26 having an annular flange 28 extending from the inner side thereof and with a reversely bent portion 32 extending outwardly from the axis of the cap. When the cover plate is not used, the hub cap is fitted directly to the outer hub member 20 of the wheel. In applying the hub cap to said outer hub member, the flange 28 on the cap is inserted within an inwardly extending flange 30 on the outer hub member and the inner wall of the reversely bent portion 32 of the cap is engaged with said flange. The hub cap is then held in position by means of the usual resilient detents 34 mounted on the inside of the flange 28 of the hub cap and having projections 36 extending outwardly through slots in said flange and engaging the inner face of the margin of the flange 30.

In the present form of the invention the cover for the spokes of the wheel comprises a disk or plate 38 preferably made of sheet metal having a central opening, the periphery of which disk is arranged to engage the rim in the manner clearly shown in Fig. 1. This plate is preferably dished in cross section and may be given any desired shape.

To the central portion of this plate is secured an annular contact member 40. This contact member is provided with an inwardly directed flange 42 extending completely about the same which is arranged to fit against the inner margin of the plate 38 and is secured thereto preferably by welding. The member 40 is also provided with a series of spaced inwardly directed flanges 44. The flanges 44 are arranged to fit against the outer face of the inwardly directed inclined flange 30 on the outer hub member 20, the flanges 44 preferably being inclined to correspond with the angle of the flange 30. The flanges 30 and 44 are secured together to attach the plate 38 to the hub of the wheel by devices which enable the plate quickly and easily to be secured in position on the wheel and to be detached therefrom. The securing devices preferably consist of displaceable clips arranged to engage said flanges. In order to locate the disk 38 accurately in the proper position with relation to the wheel, a stud 46 is secured in each of the flanges 44 and is arranged to engage in an opening 48 in the flange 30 as shown in Fig. 4.

The clips for securing together the flanges 30 and 44 are mounted respectively upon the flanges 44 and preferably have the form shown in Figs. 1, 2 and 3. Each of these clips is preferably formed of sheet metal and comprises an arm 50 by which the clip is pivoted at 52 to one of the flanges 44 and a head 54 having a U-shaped cross section as shown in Fig. 1 and arranged to embrace the flanges 30 and 44 when in holding position. Each of the clips may be swung from holding position shown in Fig. 1 inwardly to the position shown in Fig. 3 to release said flanges so that the plate 38 may be detached from the wheel. In order that the clips may be self retained in holding position, each of the flanges 44 is formed with a rounded projection 56 and the marginal portion of one side wall of the head of each clip is bent laterally toward the other side wall as indicated at 58 in Fig. 1. When a clip is swung outwardly into holding position with relation to the flanges 30 and 44, the yielding of the metal of the head of the clip allows the side walls thereof to move relatively away from each other and the laterally bent portion 58 on one of said side walls is carried outward beyond the rounded projection 56 on the corresponding flange 44. The resilience of the metal then causes the side walls to move relatively toward each other and the parts finally assume the positions shown in Fig. 1. With the clip in this position, the head of the clip is held yieldingly from being swung inwardly out of holding position by the engagement of the bent portion 58 of the side wall thereof with the projection 56. The head of each clip is preferably so constructed that the space between the side walls thereof is somewhat less than the combined thickness of the flanges 30 and 44 so that these side walls, when the clip is in holding position, will exert pressure on said flanges to clamp the same together securely.

When the clip is swung inwardly to release the same from clamping engagement with the flanges 30 and 44 the yielding of the metal allows the side walls of the head of the clip to move relatively away from each other thereby permitting the bent portion 58 on one side wall to pass the projection 56. Fig. 3 shows one of the clips in releasing position out of engagement with the flanges 30 and 44. Each of the clips is provided with an opening 60 in which a tool may be inserted to assist in swinging the clip into releasing position.

The hub cap 26 is arranged to fit the cover in the manner shown in Fig. 1. As shown in this figure, the hub cap is applied to the cover with the annular flange 28 on the cap engaging in the central opening in the plate 38 and in the corresponding opening in the flange 42 on the ring 40 and with the inner wall of the reversely bent portion 32 of the cap engaging the outer face of the inner marginal portion of said plate. The cap is held in position by the projections 36 on the resilient retaining devices 34 which engage the inner face of the margin of the flange 42.

Although the invention has been shown and described as embodied in a particular construction, it is to be understood that this construction is merely illustrative of the invention and that the invention is not limited thereto but may be embodied in other forms within the scope of the claims.

Having explained the nature and object of the invention and having specifically described a construction embodying the invention in its preferred form what is claimed is:

1. A construction for motor vehicles comprising a wheel having a flanged hub flange, a rim and a series of spokes extending between the hub and the rim, a cover for the spokes having a flange located by the side of the flange on said hub and a clamping device arranged to embrace said flanges and movable edgewise of the same into and out of clamping position for securing the cover to the wheel.

2. In a wheel structure having spokes joining a tire rim with a hub, and a cover plate enclosing the space between the outer edge of the rim and the hub for masking the spokes, securing means for the masking plate comprising clamp elements, and means pivotally securing said clamp elements on said cover plate, said clamp elements having their free end formed in U-shape with the open portion thereof positioned to be swung into embracing relation with portions of said hub and said cover plate to secure the same together.

3. In a wheel structure having spokes joining a tire rim and a hub, and a cover plate enclosing the space between the outer edge of the rim and the hub for masking spokes, securing means for the cover plate comprising clamp elements, means pivotally securing said elements on said cover plate, said clamp elements having their free end formed in U-shape with the open portion positioned to be swung into embracing relation with adjacent portions of said hub and said cover plate to secure the same together, and retainer means on said hub engageable by said clamp elements when swung into plate securing position.

4. In combination with a wheel having a hub with an inwardly directed flange, a rim and means interconnecting the hub and the rim, of a cover for said means having a flange arranged to engage said hub flange, and an attaching device pivoted relative to one of the flanges and having a portion movable edgewise of said flanges to and from a position wherein said portion straddles and engages said flanges for clamping the same together.

5. In combination with a wheel member having a flanged hub, a rim and means interconnecting the hub and rim, of a cover for the means extending between the hub and the rim and having a flange located by the side of the flange on said hub and clamping means being mounted on one of said members for movement to and from a position skirting the edges of said flanges and embracing portions of the sides of said flanges for clamping them together to secure the cover on the wheel.

6. In combination with a wheel having a flanged hub, a rim, means interconnecting said hub and said rim, of a cover for said means having a flange located by the side of the flange on said hub, and a yieldable clamping device pivotally mounted on one of said flanges and arranged to swing over the edges of the flanges into and out of a position tensionally embracing said flanges to secure the cover to the wheel.

7. In combination with a wheel member having a flanged hub, a rim, support means interconnecting the hub and the rim, of a cover member for the support means having a flange located side by side with said flange on said hub, cooperating means on said flanges for locating said members relative to each other in a predetermined relation, and a clamping device arranged to embrace said flanges and movable edgewise of the same into and out of clamping position for securing the members in said predetermined relation.

8. A construction for motor vehicles comprising wheels having spokes and a hub having a radially extending flange, a cover for the spokes having a flanged portion complementary to and adapted to bear against said radial hub flange, and clips carried by one of said flanges movable to embrace both of said flanges to clamp them together for holding the cover in position on the wheel.

RALPH S. KELLOGG.